Jan. 3, 1967 K. W. BROLING 3,295,464
TIE DOWN SYSTEM FOR HEAVY VEHICLES
Filed March 16, 1965 6 Sheets-Sheet 1

INVENTOR.
Keith W. Broling
BY *Hill, Sherman, Meroni, Gross & Simpson* ATTORNEYS Jan. 3, 1967  K. W. BROLING  3,295,464
TIE DOWN SYSTEM FOR HEAVY VEHICLES
Filed March 16, 1965  6 Sheets-Sheet 2

INVENTOR.
Keith W. Broling
BY Hill, Sherman, Meroni, Gross & Simpson ATTORNEYS

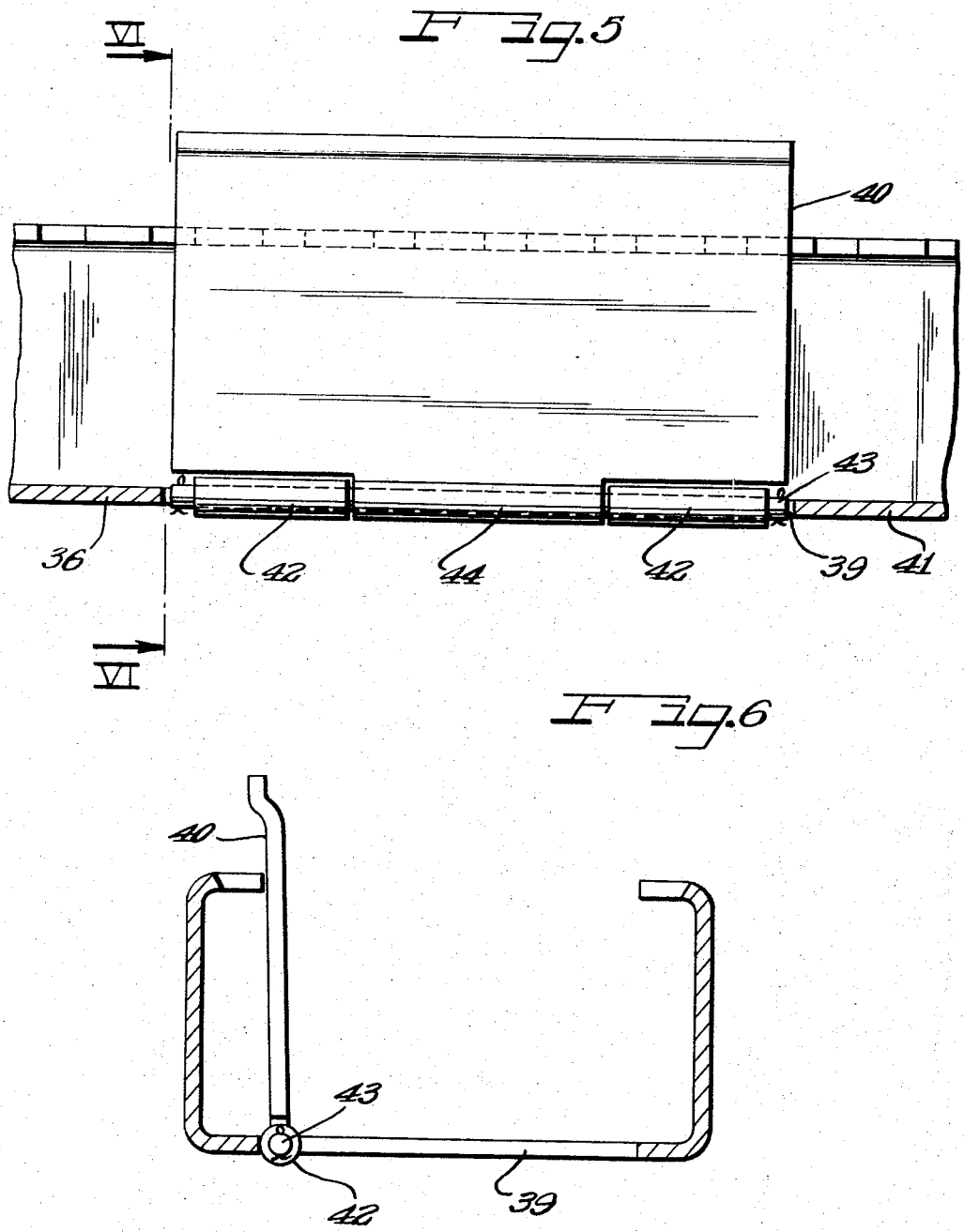

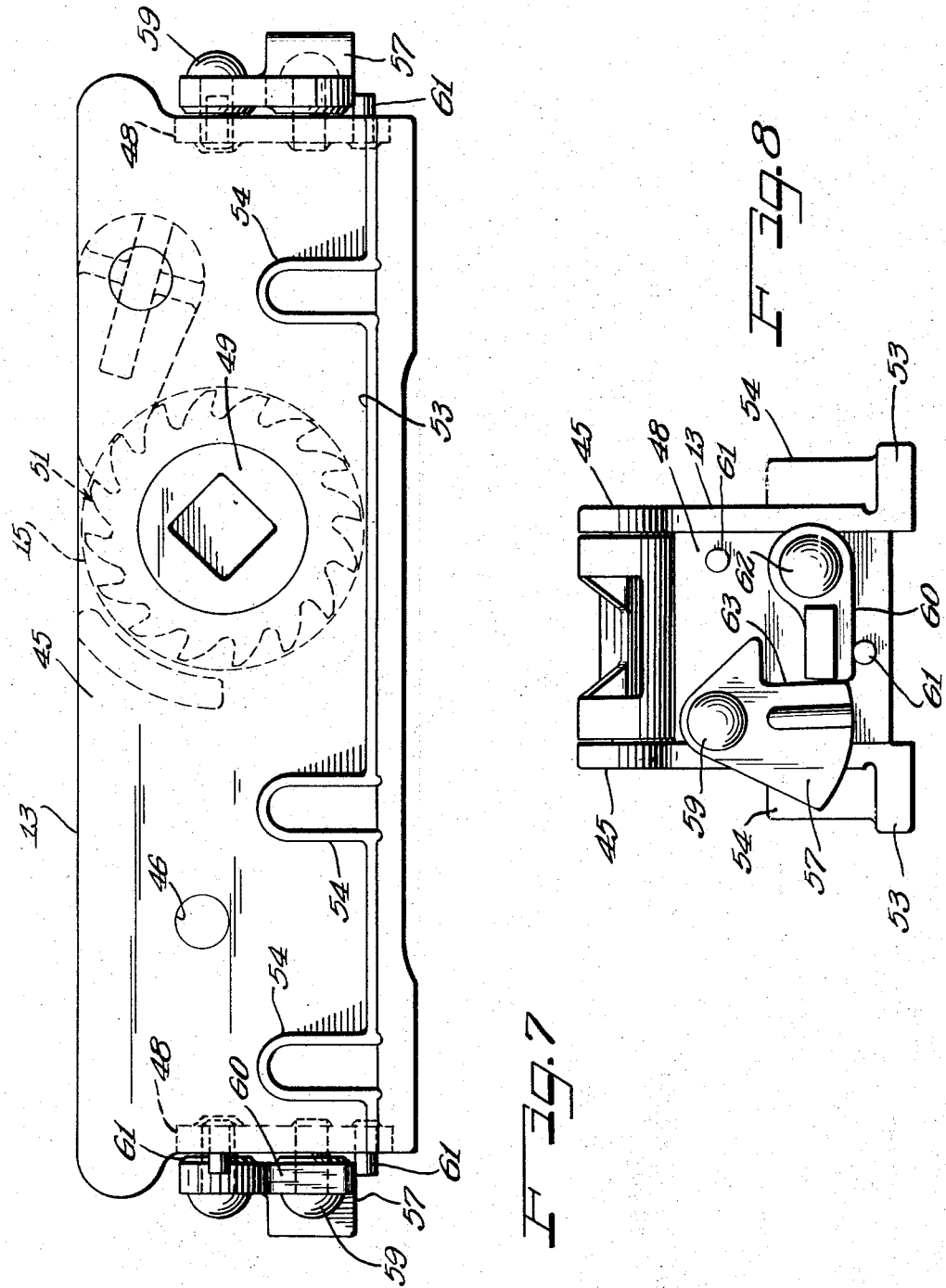

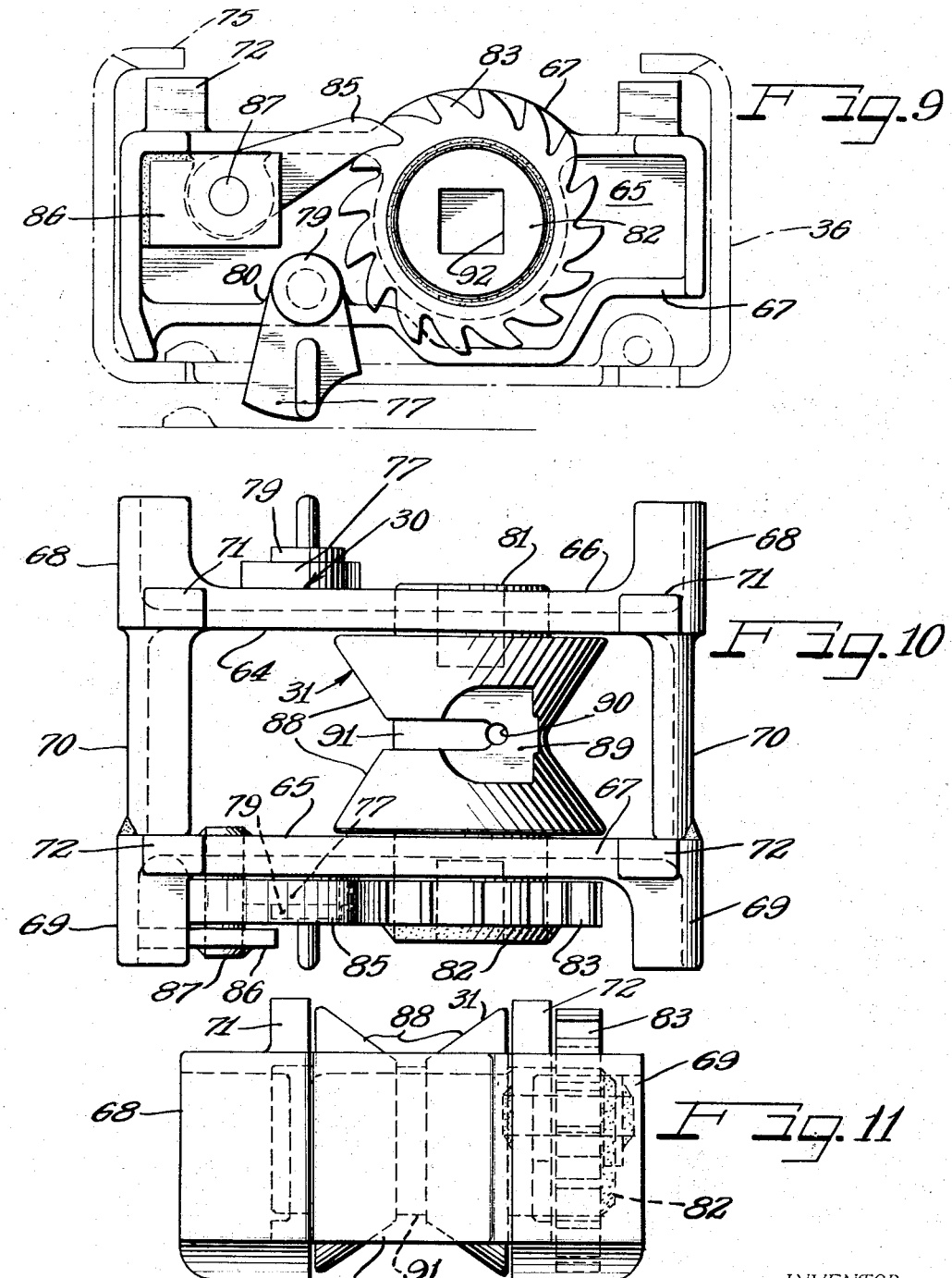

Jan. 3, 1967  K. W. BROLING  3,295,464
TIE DOWN SYSTEM FOR HEAVY VEHICLES
Filed March 16, 1965 6 Sheets-Sheet 6
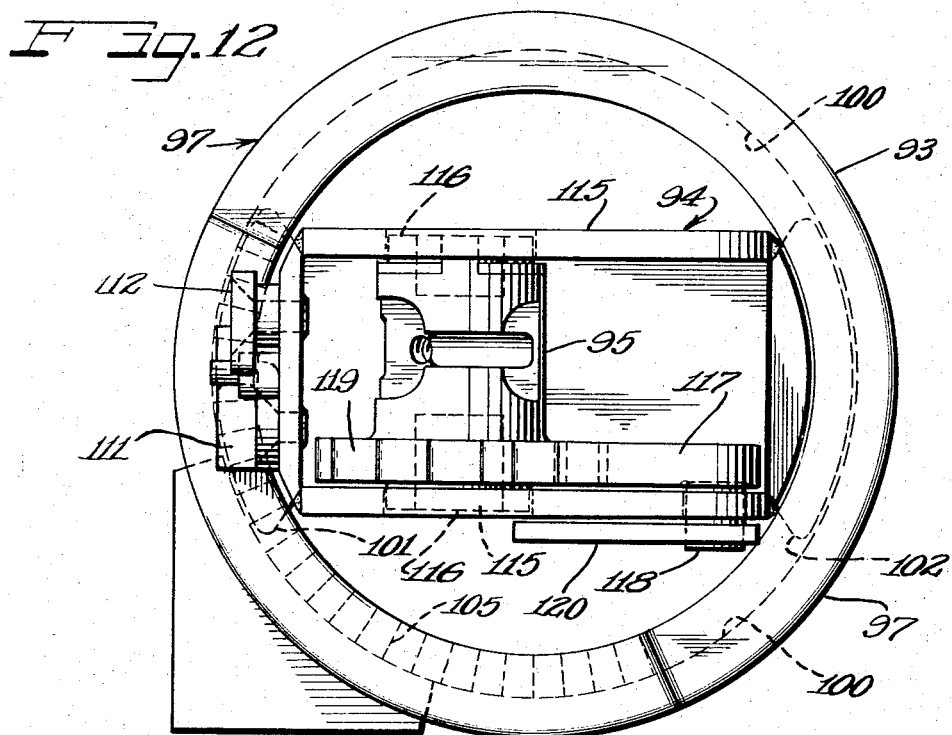
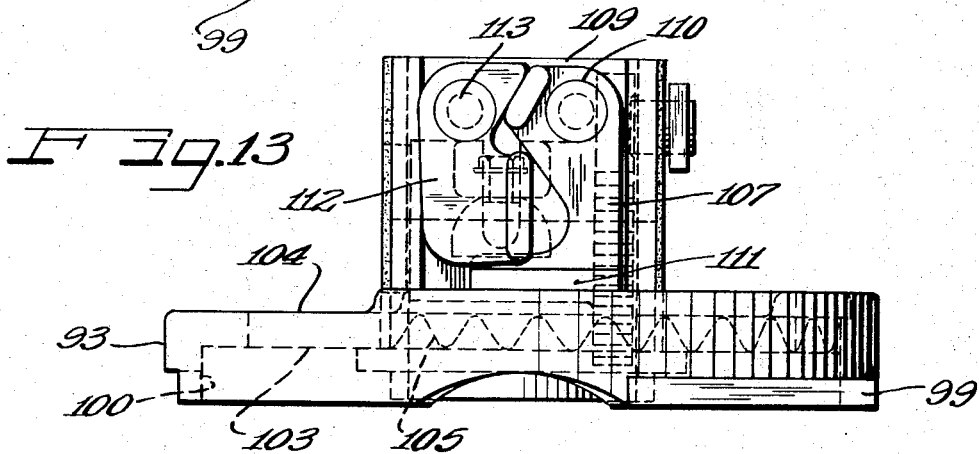
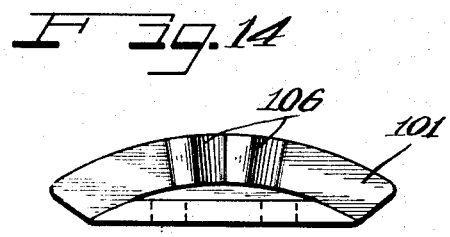
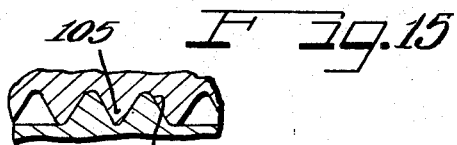
INVENTOR.
*Keith W. Broling*
BY *Hill, Sherman, Meroni, Gross Simpson*
ATTORNEYS United States Patent Office
3,295,464
Patented Jan. 3, 1967

3,295,464
TIE DOWN SYSTEM FOR HEAVY VEHICLES
Keith W. Broling, Homewood, Ill., assignor to Brandon Equipment Company Inc., Chicago, Ill., a corporation of Illinois
Filed Mar. 16, 1965, Ser. No. 440,202
11 Claims. (Cl. 105—369)

This invention relates to improvements in apparatus for securing heavy vehicles such as tractors, trucks, farm implements and the like in place on railroad flat cars for transportation.

A principal object of the present invention is to provide a tie down system for securing tractors or other mobile loads to railroad cars and the like, which is characterized by a high degree of flexibility and accessibility, enabling the operator to readily attach the tie down means to a vehicle and attain the proper tension on the tie down means and securely hold the vehicle in place on the flat car.

Another object of the invention is to provide a tie down system having a plurality of take up winches adjustably movable along the deck of a flat car and so constructed as to afford complete flexibility in positioning the tie down winches in a most favorable attaching location, for attaching a vehicle, such as a tractor, truck or other load to the flat car.

Another object of the invention is to provide a new and improved heavy duty vehicle tie down structure utilizing inboard and outboard tie down winches and guided and retained in position for efficiently securing tractors, trucks and the like in place on flat cars for transportation.

A still further object of the invention is to provide a novel and improved form of tie down system for heavy vehicles such as tractors and trucks on freight cars for transportation utilizing a series of parallel spaced inboard retaining channels having tie down winches movable therealong and retained thereto, and outboard tie down winch retaining channels extending outwardly from the floor of the car and so arranged as to afford access to the stake pockets of the car.

Still another object of the invention is to improve upon the retaining channels heretofore used for the tie down winches for tying vehicles to flat cars and the like, by providing outboard retaining channels extending along opposite sides of the car over the stake pockets of the car and having trap doors therein affording access to the stake pockets and accommodating movement of the tie down winches over the trap doors for the length of the channels.

Still another object of the invention is to provide an improved form of corner winch positionable at the corner of a car and movable into a plurality of tie down positions.

Still a further object of the invention is to provide an improved form of tie down winch positionable about a vertical axis and having improved locking means therefore locking the tie down winch in its various operative positions.

These and other objects of the invention will appear from time to time as the following specification proceeds and with reference to the accompanying drawings wherein:

FIGURE 5 is a fragmentary longitudinal sectional view taken through one of the outboard retainer channels and showing a trap door affording access to a stake pocket;

FIGURE 6 is a transverse sectional view taken substantially along line VI—VI of FIGURE 5;

FIGURE 7 is a view in side elevation of an inboard tie down winch;

FIGURE 8 is an end view of the tie down winch shown in FIGURE 7;

FIGURE 9 is a side view of an outboard tie down winch which may be used in the system of the present invention;

FIGURE 10 is a top plan view of the tie down winch shown in FIGURE 9;

FIGURE 11 is an end view of the tie down winch shown in FIGURES 9 and 10;

FIGURE 12 is a plan view of a corner winch, which may be used in the system of the present invention;

FIGURE 13 is an end view of the corner winch shown in FIGURE 12, looking at the winch toward the gravity latch therefor;

FIGURE 14 is a detail fragmentary plan view of a portion of the corner tie down showing certain details of the locking means therefor; and FIGURE 15 is a partial fragmentary detail vertical sectional view illustrating certain details of the locking means for locking the corner tie down winch in a tie down position.

Figure 1:
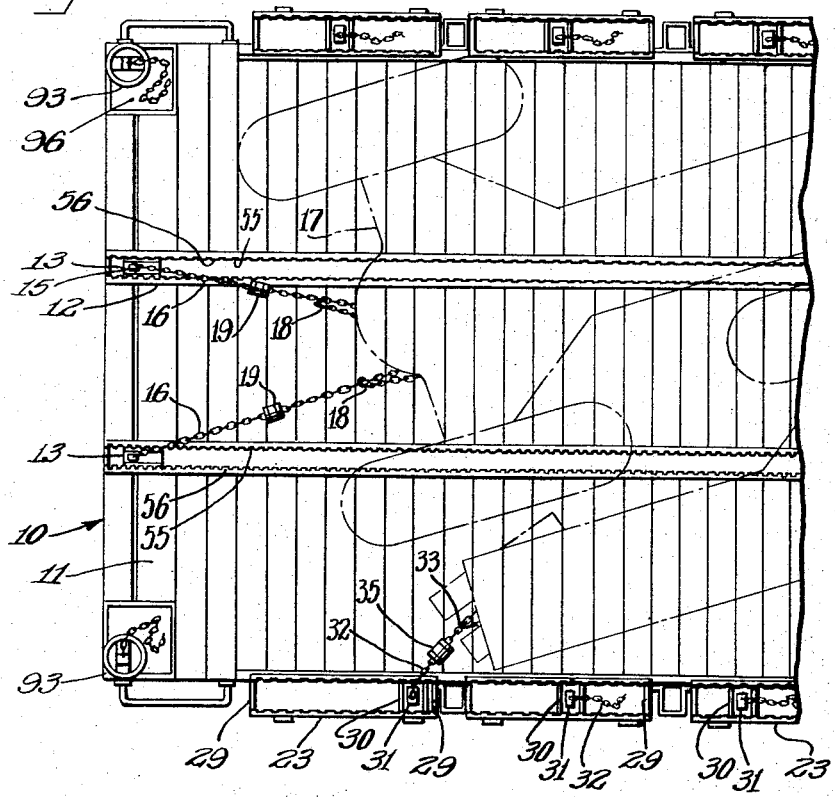
FIGURE 1 is a diagrammatic fragmentary plan view of a railway flat car showing one end portion of the car and illustrating one form in which the invention may be embodied.

In the embodiment of the invention illustrated in the drawings, I have shown in FIGURE 1 a vehicle 10, shown as being a flat car, but which may also be a truck or trailer having a flat deck. The vehicle 10 has a deck or floor 11, which is preferably made of wood and has a pair of parallel spaced retaining channels 12 recessed therein and extending for the length of the car and spaced a substantial distance inwardly of the sides of the car. The retaining channels 12 have a series of tie down winches 13, 13 guided therein for adjustable movement therealong and locked in place during a tie down operation. The retaining channels 12, 12 and tie down winches 13, 13 being spaced inwardly of the sides of the car will hereinafter be called inboard retaining channels and tie down winches.

Each inboard tie down winch 13 includes a take up drum 15 having a chain 16 wound thereon and connected to the frame structure of a vehicle 17 by suitable means, such as a grab hook or the like 18, adjustably engaging certain links of the chain. Each chain 16 is shown in FIGURE 1 as having a cushioning or compression unit 19 connected therein for reducing the shock to the chain and accommodating a slight movement of the vehicle on the car deck without slacking the chain, as shown and described in United States Patent No. 3,140,850 granted to Durward I. Packard on July 14, 1964.

The flat car 10 has the usual side plates 20 extending along opposite sides thereof downwardly of the opposite sides of the floor 11 and having stake pockets 21 mounted thereon, in spaced relation with respect to each other for the length of said side plates, for receiving and retaining load retaining stakes (not shown) to the sides of the car.

The stake pockets 21 are of the conventional form and may be made from generally U-shaped straps having feet 22 extending laterally from the legs thereof and welded or otherwise secured to the side plate 20 to form a vertically extending open receptacle.

Figure 2:
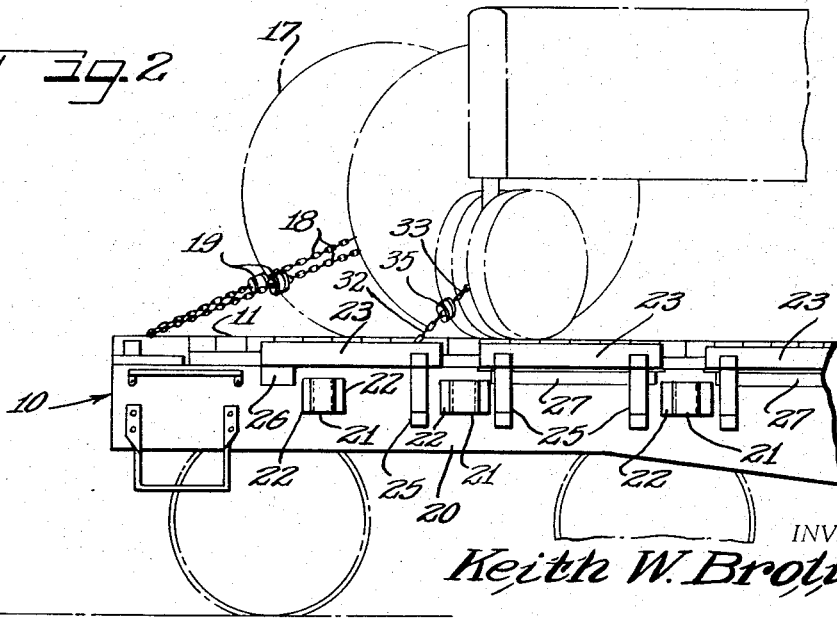
FIGURE 2 is a fragmentary diagrammatic view in side elevation of the car shown in FIGURE 1.
Figure 3:
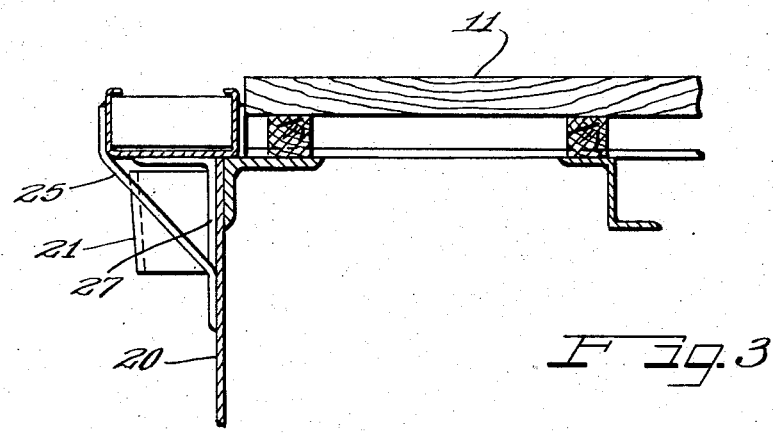
FIGURE 3 is a fragmentary detail transverse sectional view of a part of the car shown in FIGURE 1.

Between the stake pockets 21, 21 and spaced thereabove are a plurality of aligned retainer channels 23, 23 extending laterally of the floor 11 and recessed a slight distance beneath the top of said floor. As shown in FIGURE 2, the retainer channels 23, 23 are braced to the side plate 20 as by spaced braces 25, welded or otherwise secured to the plate 20, adjacent the stake pockets 21, 21 and extending angularly outwardly and upwardly therefrom along the outsides of the retainer channels 23, and welded or otherwise secured thereto. The end retainer channel 23 is shown in FIGURE 2 as being braced to the side plate 21 as by a brace 25 and as being supported on said side plate at its outer end by an angle iron 26 welded to the plate 20 on its vertical leg and having its horizontal leg positioned beneath the retainer channel 23 and forming a support therefor. In a similar manner, angle irons 27, 27 are welded to the side plate 20 on their vertical legs and form a support for the channels 23 on their horizontal legs. The ends of the retainer channels 23 are closed by closure plates 29 extending thereacross to retain outboard tie down winches 30, 30 thereto. One closure plate may be welded to its channel, while the other may be removable to accommodate the placing of a tie down winch in the channel.

Each outboard tie down winch includes a take up drum 31 mounted for rotation about an axis extending longitudinally of the car, for taking up on a tie down chain 32, which may extend about a front axle (not shown) of the vehicle 17 and be hooked thereto as a grab hook 33. A cushioning device 35, like the cushioning device 19 is provided in the chain 32. The detailed construction of the outboard tie down 30 will hereinafter be more clearly described as this specification proceeds.

Figure 4:
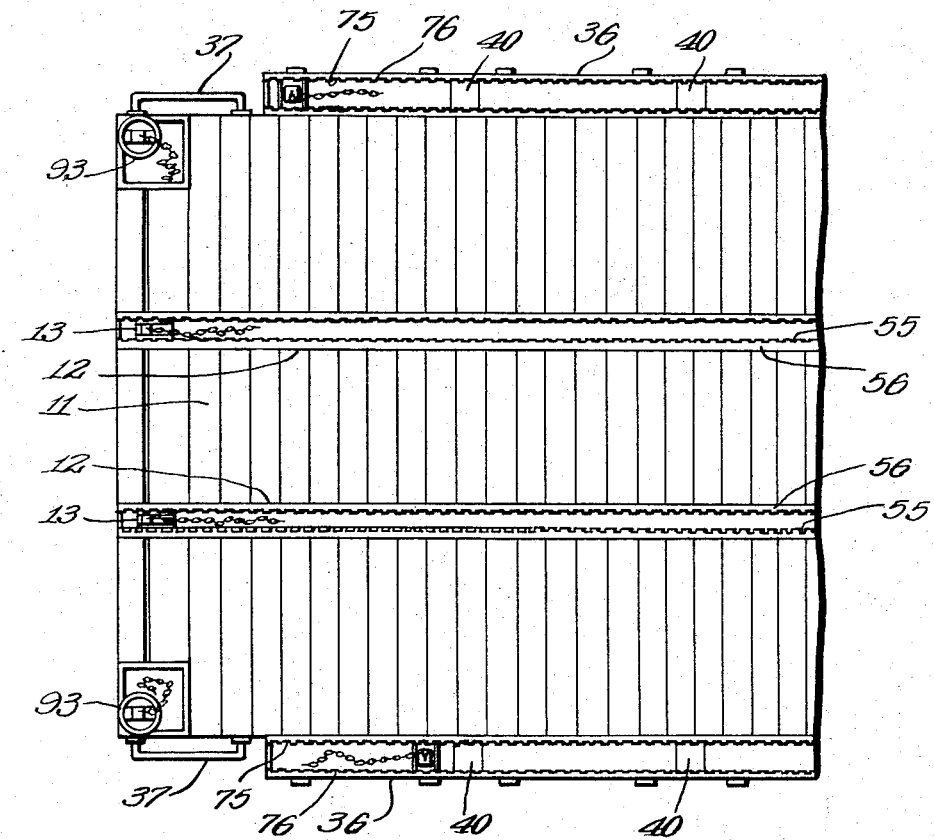
FIGURE 4 is a fragmentary plan view of one end portion of a freight car, illustrating another form in which the invention may be embodied.

In the modified form of the invention illustrated in FIGURES 4, 5 and 6, the inboard retainer channels are the same as the retainer channels 12 so will be given the same part numbers as in the form of the invention shown in FIGURE 1. The inboard and outboard tie winches are also the same and will be designated by the same part numbers as in the form of the invention illustrated in FIGURE 1.

In the modified form of the invention, outboard retainer channels 36, 36 extend outwardly of each side of the car inwardly of grab rails 37 and extend along the space between said grab rails. The retainer channels 36 extend over the stake pockets 21 and have access openings 39 therein, in registry with the stake pockets, affording a means for access to the stake pockets, to mount stakes therein. Each access opening 39 is closed by a door 40, affording a means to accommodate outboard tie downs to be retained in position in the retainer channels 36, at any desired place therealong. As shown in FIGURES 5 and 6, a bottom wall 41 of the retainer channel 36 has spaced elongated hinge lugs 42 extending inwardly of the opening 39 and forming a support for a hinge pin 43 extending through an elongated hinge lug 44 interleaved by the lugs 42, 42 and hingedly mounting the door 40 to the web or bottom wall 41 of the channel to provide access to the stake pockets 21. When the stakes are not used the doors 40 prevent the chains 32 from falling through the openings 39, as well as accommodate the outboard tie down winches to be adjustably moved for the length of the outboard channels.

The inboard anchoring winches 13 in the inboard channels 12 as shown in FIGURES 7 and 8 are similar in construction to the winches shown in the aforementioned United States Patent to Packard No. 3,140,850, dated July 14, 1964, except side plates 45 of the winches have apertured portions 46, the apertures of which afford a means for attaching leading straps or wires (not shown) thereto. The side plates 45 are connected together at their opposite ends by end walls 48 and have a drum shaft 49 rotatably mounted therein and forming a rotatable support for the take up drum 15 for the chain 16, taking up on said chain and retaining said chain under tension by a pawl and ratchet mechanism 51 of a conventional form. The drum shaft 49 has a squared socket therein affording a means for receiving a hand crank, ratchet device or the like (not shown), for turning the take up drum to take up tension on the chain 16.

The side plates 45 have flanges 53 extending outwardly from the lower ends thereof having retainer lugs 54 extending upwardly therefrom along the outer walls of the side plates 45 for a portion of the height thereof.

The retainer lugs 54 are adapted to register with notches 55 in inwardly extending retaining flanges 56 of the retaining channels 12, upon upwardly pulling movement on the take up winch 13, as by grasping the chain 16. The take up winch 13 is locked in position along the channel 12 with the lugs 54 in engagement with certain of the notches 55, by latches 57 pivotally mounted on opposite end walls 48 of the take up winch on pivot pins 59. The latches 57 are locked in the position shown in FIGURE 8 to project outwardly of the side plates 45 to engage the top surfaces of the retaining flanges 56, by safety latches 60 pivotally mounted on the plates 48 for movement between spaced stop pins 61 on pivot pins 62. The safety latch when in engagement with the lower pivot pin 61 engages a plane face 63 of the latch 57 to hold the latch in its locking position. It should be understood that one latch 57 projects to one side of one side plate 45 while a latch 57 on the opposite end of the take up winch projects to the opposite side of the side plate 45.

In FIGURE 9 of the drawings, the outboard tie down winch 30 is shown in a retaining channel 36, the channel 36 being shown in broken lines. The outboard tie down 30 extends transversely of the channel 36 and includes parallel connected side frame members 64 and 65. In order to provide maximum strength and ruggedness, with minimum weight and material, the side frame members are in the form of panels of minimum thickness throughout their major area, consistent with heavy duty usage. The panels are provided with marginal reinforcing ribs 66 and 67 respectively. The reinforcing ribs 66 and 67 are widened at the opposite ends of the side frame members, to form guide flanges 68 and 69 respectively, for guiding the tie down winch for adjustable movement along the side walls of the associated retainer channel. The side frame member 64 has parallel spaced legs 70 extending inwardly from opposite ends thereof into abutting engagement with the inside of the side frame member 65 and welded or otherwise secured thereto, to form an open generally rectangular frame structure for the take up drum 31. Lugs 71 and 72 project upwardly of opposite ends of the respective side frame members 64 and 65, for registry with locking notches 75 formed in inturned retainer flanges 76 of the channels 36.

A gravity lock 77 is shown as pivoted to each side frame member 65 and 66 on pivot pins 79. The mounting for each gravity lock is the same so one only need herein be described. The pin 79 extends through a boss 80 formed in the lower rib 67. The gravity lock 77 drops to the position shown in FIGURE 9 upon upward lifting movement of the outboard take up winch, as the lugs 71 and 72 are engaged with the notches 75, to retain the take up winch in its locked position in engagement with said notches.

The take up drum 31 is mounted between the side frame members 64 and 65 on a stub shaft 81, extending from one side of said drum and rotatably mounted in the side frame member 64, and on a second stub shaft 82, extending from the other end of the drum 31 and rotatably mounted in the side frame member 65 and extending outwardly therefrom. A ratchet wheel 83 is welded or otherwise secured to the stub shaft 82 and is retained from rotation in an unwinding direction by a releasable pawl 85, pivotally mounted between a bracket plate 86 spaced outwardly of the side frame member 65 and the outside of the rib 67 of said side frame member, on a pivot pin 87. The bracket plate 86 is welded or otherwise secured to the undersurface of the rib 67 and the inner side of the flanged guide portion 69 thereof, to form a support for the outer end of the pivot pin 87.

The take up drum 31 has two inwardly converging frusto-conical faces 88 forming a generally V-shaped recess for the chain 32 and having a socket 89 for a link of the chain, and a hole 90 opening thereinto to accommodate the link of the chain to be secured thereto as by a machine screw or nut and bolt (not shown), in a conventional manner. A groove 91 for a link of the chain leads from the socket 89 and extends partially about the drum.

The pawl 85 and ratchet 83, being on the outside of the side frame member 65 and being protected by the rib 67, the chain 32 may be trained angularly to one side or the other of the take up drum 31 without interfering with the pawl and ratchet. A socket 92, herein shown as being squared, is provided in the end of the stub shaft 82, to accommodate the turning of said shaft and the drum 31 by a crank or ratchet device and the like. The outboard take ups 30 may thus be used for either right or left hand angularity of the chains in tying to a load in either of the channels 23 or 36, and when used in the channels 36 may be positioned at any desired position along said channels.

A corner tie down 93 is provided at each corner of the car and includes a tie down housing 94 and tie down drum 95, rotatably mounted therein and adjustable to extend longitudinally or transversely of the car or at various angles between the longitudinal and transverse positions thereof. The corner tie down 93 is mounted on a base plate 96 at a corner of the car, and includes a base ring 97 having a wing 99 extending from the side thereof. The wing 99 has a generally right angled outer face, the apex of which extends radially of the center of the base ring 97 and is adapted to be positioned at a corner of the base plate 96 to properly locate the base ring at the corner of a car. The base ring 97 has an interior cylindrical wall 100 forming a guide for retainer sectors 101 and 102 extending from the housing 94 beneath a retaining surface 103 of a stepped flange 104. The portion of the stepped flange 104 at a higher level has downwardly facing locking teeth 105 formed therein, which terminate on the level of the retaining surface 103 of the stepped flange. The teeth 105 are adapted to be engaged with upwardly facing teeth 106 on the sector 101, upon tilting movement of the tie down frame 94 as by an upward pulling force on the tie down chain (not shown) attached thereto.

A gravity lock 107 is pivoted to an end plate 109 of the frame 94 on a pivot pin 110, the axis of which extends longitudinally of said frame. The gravity lock 107 has a foot 111 adapted to rest on the top surface of the portion of the stepped flange 104 of higher elevation to lock the teeth 106 in engagement with the teeth 105 and lock the frame 94 in position.

The gravity lock 107 is held in its locked position by a safety latch 112 pivoted to the end plate 109 on a pivot pin 113 extending parallel to the pivot pin 110 and to one side thereof.

The drum 95 is rotatably mounted in side walls 115, 115 of the drum housing 94 on stub shafts 116, 116 mounted in and extending outwardly of opposite ends of said drum. A pawl 117 extends along the inside of one side wall 115, and is pivotally mounted thereon on a pivot pin 118. The teeth of a ratchet 119 on a stub shaft 116, and rotatable with the drum 95, are engaged by the pawl 117 to hold the drum 95 from rotation in a tension slackening direction. A hand lever 120 on the outer end of the pin 118 is provided to release the pawl 117.

The corner tie down may thus be adjustably moved through an angle of 90°, to position the drum 95 to extend at take up positions either longitudinally or transversely of the car, or at various angles between the longitudinal and transverse take up positions of the drum, and may be locked in these positions during a take up operation.

While I have herein shown and described one form in which the invention may be embodied, it should be understood that various modifications and variations in the invention may be attained without departing from the spirit and scope of the novel concepts thereof.

I claim as my invention:
1. In a tie down apparatus for freight cars and the like and in combination with a flat car having a deck and spaced stake pockets at opposite sides of said deck and a pair of parallel spaced channel-like retainers extending along opposite sides of said deck above said stake pockets,
  each channel-like retainer having at least one outboard tie down winch mounted therein for adjustable movement therealong and having inwardly extending retainer flanges recessed beneath the floor of the deck and adapted to have interengagement with the tie down winch for retaining the winch in an operative tie down position,
  said channel-like retainers having openings therein registering with said stake pockets and having trap doors pivoted to the bottoms thereof closing the space between said stake pockets and accommodating movement of a tie down winch therealong over said openings and the placing of stakes in said stake pockets upon the opening of said trap doors.

2. The structure of claim 1,
  wherein the tie down winch includes
    a pair of parallel spaced side plates connected together at their lower ends and extending transversely of the channel-like retainer,
    a drum rotatably mounted between said side plates and having shaft portions rotatably mounted in said side plates and extending longitudinally of said channels,
    one shaft portion having a ratchet thereon,
    a apawl engageable with said ratchet and retaining said drum from rotation in the direction to slacken the flexible tie down device,
    and said drum having a generally V-shaped face diverging from the center there of and having a chain receiving socket therein for attachment of a link of a tie down chain thereto, and accommodating the training of said chain into a tie down position angularly beyond one or the other of said side plates.

3. The structure of claim 2,
  wherein a gravity lock is pivoted to at least one of said side plates for movement downwardly by gravity to engage the channel-like retainer and maintain the which in interengagement with said inwardly extending retainer flanges.

4. In a system for tying down heavy mobile equipment to a vehicle having a flat deck and spaced stake pockets extending laterally from opposite sides of said deck,
  a pair of parallel spaced inboard channel-like retainers recesed in said deck inwardly of the sides thereof and extending for the length thereof and having inwardly extending retainer flanges adjacent the surface of the deck,
  a pair of parallel spaced outboard channel-like retainers extending outwardly of said deck over said stake pockets and having inwardly extending retainer flanges adjacent the surface of said deck,
  said channel-like retainers having generally flat bottoms having open portions in registry with said stake pockets to accommodate the insertion of stakes therein and having trap doors pivoted to said flat bottoms for movement over said open portions for selectively closing said open portions,
  inboard tie down devices carried by said inborad retainers for independent movement therealong,
  and a plurality of outboard tie down devices carried by said outboard retainers for independent adjustable movement therealong over the closed doors,
  and other tie downs at each corner of the vehicle having tie down drums positionable to extend transversely and longitudinally of the car and into angular positions between aid transverse and longitudinal positions.

5. In an anchoring device for anchoring heavy vehicles to flat cars and the like,
   a base adapted to be secured to the floor of the car and having an annular guide extending upwardly of the floor of the car having an inner cylindrical wall,
   a stepped flange extending radially inwardly of said guide and having one flanged portion at one level and another flanged portion at a higher level having downwardly opening teeth formed therein,
   a tie down member within said guide and including parallel spaced side frame members and at least one end wall connecting said side frame member together,
   retainer sectors extending outwardly of said side frame members adjacent the lower ends thereof and having guiding engagement with said cylindrical wall and extending under said stepped flange,
   a drum rotatably mounted between said side frame members,
   ratchet means retaining said drum from rotation in one direction,
   a flexible tie down member secured to said drum and maintained under tension thereby,
   and one of said retainer sectors having upwardly facing teeth thereon engaged with said downwardly facing teeth on said flange by upwardly pulling movement on said flexible tie down member.

6. An anchoring device in accordance with claim 5, wherein a gravity latch is pivotally mounted on said end wall for engagement with the stepped portion of said flange of greater elevation upon meshing of the teeth on said flanged portion and retainer sector, to lock said anchoring device in position.

7. In a system for tying down heavy equipment to a vehicle having a flat deck and spaced stake pockets extending laterally from opposite sides of said deck,
   a pair of parallel spaced inboard channel-like retainers recessed in said deck inwardly of the sides thereof and extending therealong and having inwardly extending retainer flanges adjacent the surface of the deck,
   a pair of parallel spaced outboard channel-like retainers extending along said deck over said stake pockets and having inwardly extending retainer flanges extending therealong adjacent the surface of the deck,
   inboard and outboard tie down devices carried in each inboard and outboard retainer for adjustable movement therealong,
   said outboard retainers having relatively flat bottoms wherein the inboard tie down devices are winches having open portions in registry with said stake pockets,
   and having trap doors closing the open portions thereof to accommodate free movement of the outboard tie down devices along said retainers,
   said trap doors being movable upwardly to accommodate the insertion of stakes in said stake pockets.

8. The structure of claim 7,
   having take up drums rotatable about axes extending transversely of the inboard retainers,
   and wherein the outboard tie down devices are winches having take up drums rotatable about axes extending generally longitudinally of the associated retainer.

9. The structure of claim 8,
wherein the take-up drums of the outboard tie down devices have recessed generally V-shaped faces converging inwardly from the sides to the center thereof and accommodating the training of a tie down chain angularly of the take-up drum forwardly or rearwardly of said drum.

10. In an anchoring device for anchoring heavy vehicles to flat cars and the like,
    a base adapted to be secured to the floor of a car and having an annular guide, extending upwardly of the floor of the car, having an inner cylindrical wall,
    a flange extending radially inwardly of said guide in vertically spaced relation with respect to said base,
    an anchoring device within said guide and including
    a frame adapted to rest on said base and guided by said guide for rotatable movement about a vertical axis and having
       a pair of parallel spaced connected side frame members,
       a drum rotatably mounted between said side frame members,
       ratchet means retaining said drum from rotation in one direction,
       a flexible tie down member secured to said drum and maintained under tension thereby,
    at least one retainer member extending outwardly of said side frame members and having guiding engagement with said cylindrical wall and extending under said flange,
    the underside of said flange and the top surface of said retainer member having facing interengageable projections extending downwardly and upwardly therefrom, adapted to have interengagement with each other and to lock said frame and anchoring device from rotational movement about a vertical axis by upward pulling movement on said flexible tie down member and registering said projections to have interengagement with each other.

11. The structure of claim 10,
    wherein a gravity latch is pivotally mounted on said frame for said anchoring device, for engagement with the top surface of said flange upon upward pulling movement on said flexible tie down member and interengagement of said projections, to lock said anchoring device in position.

References Cited by the Examiner

UNITED STATES PATENTS

| | | | |
|---|---|---|---|
| 1,934,697 | 11/1933 | Butterworth | 105—368 |
| 2,078,052 | 4/1937 | Butterworth | 105—368 |
| 2,128,667 | 8/1938 | Atherton | 105—368 |
| 2,358,580 | 9/1944 | Leonard | 242—117 |
| 2,970,552 | 2/1961 | Baker | 105—368 |
| 3,092,368 | 6/1963 | McDowell et al. | 105—368 X |
| 3,140,850 | 7/1964 | Packard | 105—368 X |
| 3,181,886 | 5/1965 | Blunden et al. | 280—179 |
| 3,187,686 | 6/1965 | De Podesta | 105—368 |

ARTHUR L. LA POINT, *Primary Examiner.*

DRAYTON E. HOFFMAN, *Examiner.*